(12) United States Patent
Le Moullec (10) Patent No.: US 9,702,269 B2
(45) Date of Patent: Jul. 11, 2017

(54) DEVICE FOR CAPTURE OF ACID GAS CONTAINED IN COMBUSTION FUMES

(71) Applicant: ELECTRICITE DE FRANCE, Paris (FR)

(72) Inventor: Yann Le Moullec, Croissy sur Seine (FR)

(73) Assignee: ELECTRICITE DE FRANCE, Paris (FR)

( * ) Notice: Subject to any disclaimer, the term of this patent is extended or adjusted under 35 U.S.C. 154(b) by 333 days.

(21) Appl. No.: 14/338,293

(22) Filed: Jul. 22, 2014

(65) Prior Publication Data
US 2015/0027120 A1 Jan. 29, 2015

(30) Foreign Application Priority Data
Jul. 23, 2013 (FR) ..................................... 13 57262

(51) Int. Cl.
*F01K 17/04* (2006.01)
*B01D 53/14* (2006.01)

(52) U.S. Cl.
CPC .......... *F01K 17/04* (2013.01); *B01D 53/1425* (2013.01); *B01D 53/1456* (2013.01); *B01D 53/1475* (2013.01); *B01D 2258/0283* (2013.01); *B01D 2259/65* (2013.01); *Y02E 20/326* (2013.01)

(58) Field of Classification Search
CPC . F01K 17/04; B01D 53/1456; B01D 53/1425; B01D 2258/0283; B01D 2259/65; B01D 53/1475
USPC .......... 60/646, 657, 653, 649, 673, 677–680
See application file for complete search history.

(56) References Cited

U.S. PATENT DOCUMENTS

| 8,506,693 B2* | 8/2013 | Nagayasu .......... B01D 53/1418 422/170 |
| 8,808,429 B2* | 8/2014 | Woodhouse ....... B01D 53/1425 95/183 |
| 2009/0151566 A1 | 6/2009 | Handagama et al. |

(Continued)

FOREIGN PATENT DOCUMENTS

| CA | 2 814 354 A1 | 6/2012 |
| CA | 2 814 470 A1 | 4/2013 |

(Continued)

*Primary Examiner* — Hoang Nguyen
(74) *Attorney, Agent, or Firm* — Blakely Sokoloff Taylor & Zafman LLP (57) ABSTRACT

A device for capture of acid gas of combustion fumes of a thermal power plant, including:
absorption means (10) of the gas by capture fluid,
a regenerator (1) where the capture fluid and a regeneration fluid steam are put in contact,
introduction means (11) of the regeneration fluid in the regenerator,
condensation means (2, 3, 4), at the head of said regenerator,
separation means (6) of liquid phase of the regeneration fluid and gaseous phase rich in acid gas,
Wherein:
the regeneration fluid steam introduced is superheated,
the regenerator (1) includes means limiting the contact time to substantially maintain the flow rate of regeneration fluid steam,
the condensation means (2, 3, 4) are in thermal exchange with first evaporation means of working fluid, and
first reintroduction means (13) of steam obtained in a turbine (14).

18 Claims, 5 Drawing Sheets

(56) References Cited

U.S. PATENT DOCUMENTS

| | | |
|---|---|---|
| 2011/0072820 A1 | 3/2011 | Finkenrath et al. |
| 2011/0079151 A1* | 4/2011 | Ohashi ............... B01D 53/1425 96/242 |
| 2011/0192191 A1* | 8/2011 | Timminns .......... B01D 53/1425 62/617 |
| 2012/0096865 A1 | 4/2012 | Murakami et al. |

FOREIGN PATENT DOCUMENTS

| | | |
|---|---|---|
| DE | 10 2010 010 540 A1 | 9/2011 |
| EP | 2 444 141 A1 | 4/2012 |

* cited by examiner

DEVICE FOR CAPTURE OF ACID GAS CONTAINED IN COMBUSTION FUMES

FIELD OF THE INVENTION

The field of the invention is that of the capture of acid gas contained in combustion fumes of a thermal power plant including a steam circuit, in particular a burning thermal power plant.

PRIOR ART

There are devices and methods for capture of acid gas contained in combustion fumes of a thermal power plant.

Techniques for capture of acid gas, in particular carbon dioxide, which have reached the greatest maturity are based on chemical absorption of the acid gas in a capture fluid including a solvent, in particular an amine-based solvent. When such techniques are being conducted, it is necessary to regenerate the capture fluid used. However such a regeneration step needs a large contribution of heat. This heat generally comes from strong condensation of low-pressure steam of the steam circuit. It is necessary to condense a significant portion of the low-pressure steam, typically between 30 and 60%.

Figure 1:
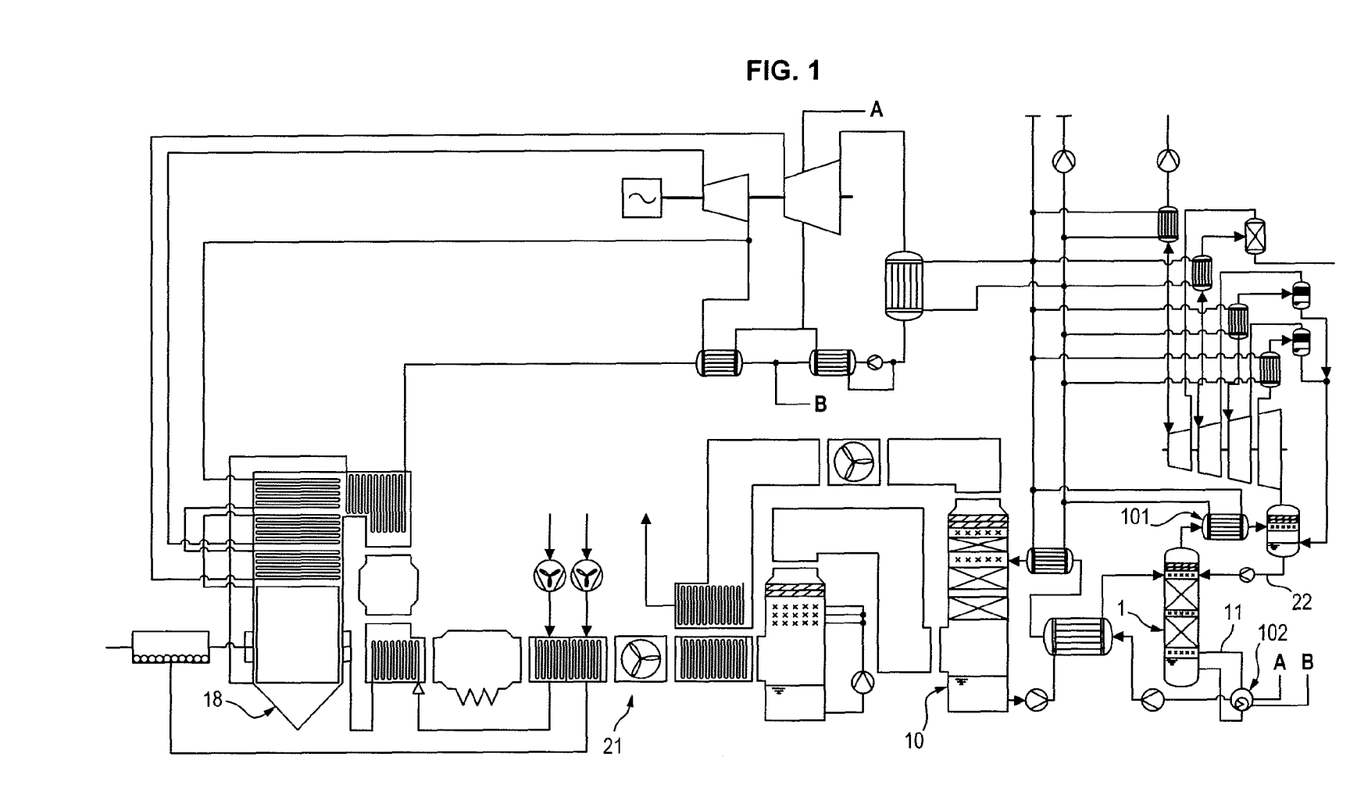
FIG. 1, already described, schematically illustrates a thermal power plant including a device for capture of acid gas according to the prior art, FIG. 2a schematically illustrates a thermal power plant including a device for capture of acid gas according to a first exemplary embodiment of the invention, FIG. 2b schematically illustrates the device for capture of acid gas according to the first exemplary embodiment of the invention FIG. 3 schematically illustrates a device for capture of acid gas according to a second exemplary embodiment of the invention FIG. 4 schematically illustrates a device for capture of acid gas according to a third exemplary embodiment of the invention, FIG. 5 schematically illustrates a device for capture of acid gas according to a fourth exemplary embodiment of the invention, FIG. 6 schematically illustrates a device for capture of acid gas according to a fifth exemplary embodiment of the invention.

In reference to FIG. 1, a synthetic diagram of an electric power plant is described, including a device for capture of acid gas according to such a known technique. The fumes coning from combustion of a boiler 18 are conveyed via a system of conduits 21 to absorption means 10 of at least one acid gas. The acid gas is absorbed by contacting the fumes with a capture fluid including a solvent, the capture fluid being low in acid gas. The capture fluid coming from the absorption means 10 is the capture fluid enriched in acid gas.

The device includes a regenerator 1, wherein the capture fluid enriched with acid gas and the regeneration fluid steam are put in contact. This regeneration fluid steam is introduced to regenerate the capture fluid in the regenerator 1 by introduction means 11.

The device includes condensation means 101 arranged at the head of the regenerator 1. The condensation means are adapted to condense the gaseous fluid coming from the regenerator in a medium containing a liquid phase of the regeneration fluid and a gaseous phase rich in acid gas. The liquid phase of the regeneration fluid is reintroduced to the regenerator by return means 22 of the regeneration fluid. Therefore the acid gas is isolated in the gaseous phase rich in acid gas.

The heat necessary for the regenerator 1 is provided to the regeneration fluid by low-pressure steam taken from the steam circuit of the power plant, via a fluidic connection shown by the two arrows referenced A, and with which the regeneration fluid is in thermal exchange in the redistiller 102. The sampled steam has partially condensed in the redistiller 102, forming fluid which is reinjected via a fluidic connection shown by the two arrows referenced B in the steam circuit of the power plant.

Such techniques cause major loss of yield of the cycle of the power plant. Losses caused by condensation of the low-pressure steam in general go from 7 to 9% of the yield. To these losses are added losses linked to consumption of auxiliary equipment of the capture of the acid gas. The auxiliaries include for example a pumping system of the capture fluid, a ventilator, or an acid gas compressor. Losses linked to the auxiliaries in general amount to around 3% of the yield of the steam cycle. These considerable losses in yield are strongly penalising in terms of cost-effectiveness of the power plant where such techniques are implemented.

These disadvantages limit the possibilities for putting in place a device for capture of acid gas coupled to a steam circuit.

One possibility is to reduce the pressure of the steam necessary for the redistiller. The use of steam at lower pressure reduces the impact of the sampling of steam on the yield of the power plant. However such a possibility needs substantial increase in the size of the device equipment, due to lower operating pressure, and involves greater compression work to provide the acid gas to a transport network for acid gas.

Another possibility is to modify the steam cycle in light of optimising the quantity of steam necessary for the cycle. However such a possibility generally involves an increase in the complexity of the boiler and of the steam circuit.

SUMMARY OF THE INVENTION

An aim of the invention is to provide a device for capture of acid gas contained in combustion fumes of a thermal power plant including a steam circuit which does not have these disadvantages. In particular, an aim of the invention is to provide such a device which reduces the yield loss associated with regeneration of $CO_2$.

To this end, a device for capture of acid gas contained in combustion fumes of a thermal power plant including a steam circuit is provided, the device including:
- acid gas absorption means by contacting the fumes with a capture fluid low in acid gas,
- a regenerator wherein the capture fluid enriched with acid gas and of the regeneration fluid steam introduced to regenerate the capture fluid are put in contact,
- first introduction means of the regeneration fluid steam to the regenerator,
- first condensation means in a medium containing a liquid phase of the regeneration fluid and a gaseous phase rich in acid gas, arranged at the head of said regenerator,
- separation means of the liquid phase of the regeneration fluid and of the gaseous phase rich in acid gas, wherein:
- steam from the regeneration fluid introduced to regenerate the capture fluid is superheated steam,
- the regenerator includes contact means between the capture fluid enriched with acid gas and the superheated regeneration fluid steam, limiting the contact time between the two such that the flow rate of regeneration fluid steam is substantially maintained,
- the first condensation means are means of a first evapo-condenser and are in thermal exchange with first evaporation means of the first evapo-condenser, which evaporate a working fluid, and
- the device includes first reintroduction means of the steam of the resulting working fluid in a first turbine.

The invention is advantageously completed by the following characteristics, taken singly or in any of their technically possible combinations:
- the absorption means are adapted to:
  - evaporate an excess of regeneration fluid present in the capture fluid, and
  - mix said excess of regeneration fluid evaporated with the liquid phase of the regeneration fluid downstream of the first condensation means;
- the first condensation means include partial condensers adapted to limit the proportion of impurities in the regeneration fluid liquid phase condensed by the first condensation means, at least one liquid portion of regeneration fluid partially condensed by a partial condenser being recycled in the regenerator;

compression means of the gaseous phase rich in acid gas, in thermal exchange with the first evapo-condenser to:
evaporate at least partially the working fluid, and/or
evaporate at least partially the regeneration fluid upstream of the regenerator;

flashing means of the working fluid upstream of the first evaporation means, a steam phase of the expanded working fluid being introduced to the turbine via the first reintroduction means, and a liquid phase of the expanded working fluid being reintroduced to a preheating train;

superheating means adapted to re-superheat the working fluid downstream of the first evapo-condenser;

the capture fluid includes an aqueous amine solution;

the working fluid and/or the regeneration fluid is water;

purification means of the separate aqueous liquid phase, located downstream of the separation means;

the purification means include a filtration system on active carbon and/or a resin ion exchange system, and/or an electrodialysis system;

the first introduction means of regeneration fluid steam are first introduction means of steam from:
the first turbine, the first being a turbine of said steam circuit or
a second turbine, the second turbine being a turbine of said steam circuit;

the regeneration fluid and the working fluid are formed from working fluid of the steam circuit, the turbine(s) belonging to the steam circuit;

the first turbine belongs to a closed working fluid circuit separate from the steam circuit, the working fluid circuit forming an organic Rankine cycle, and the device includes second reintroduction means of the separate regeneration fluid at the level of a boiler of the steam circuit;

the device includes:
second condensation means of the working fluid, located upstream of the first evapo-condenser adapted to condense said working fluid,
second introduction means of the working fluid from the steam circuit to the second condensation means, the second condensation means being means of a second evapo-condenser, the second evapo-condenser also including second evaporation means which evaporate the regeneration fluid downstream of the separation means and upstream of the first introduction means, the second evaporation means being in thermal exchange with the second condensation means;

the second evapo-condenser met directly in contact the fluid of second condensation means and the fluid of second evaporation means;

the first evapo-condenser or the second evapo-condenser is a column putting the fluid of the first condensation means and the fluid of the first evaporation means directly in contact.

According to another aspect, the invention relates to a thermal power plant including a steam circuit and a boiler, the power plant including such a device.

According to yet another aspect, the invention relates to a method for capture of acid gas contained in combustion fumes of a thermal power plant including a steam circuit, the method including steps consisting of:

chemical absorption of the acid gas by contacting the fumes with a capture fluid low in acid gas, regeneration of the capture fluid by contacting of the capture fluid enriched with acid gas and of regeneration fluid steam introduced to regenerate the capture fluid, introduction of the regeneration fluid steam, condensation of a medium containing regeneration fluid and acid gases after regeneration, in a medium containing a liquid phase of the regeneration fluid and a gaseous phase rich in acid gas, separation of the liquid phase of the regeneration fluid and of the gaseous phase rich in acid gas, wherein:
steam from the regeneration fluid introduced to regenerate the capture fluid is superheated steam, regeneration includes limitation of the contact time between the capture fluid enriched with acid gas and the regeneration fluid steam such that the flow rate of regeneration fluid steam is substantially maintained, condensation is performed in thermal exchange with evaporation of working turbine fluid, and the method also includes the reintroduction to a first turbine of the steam of the working fluid obtained by evaporation.

BRIEF DESCRIPTION OF THE FIGURES

Other characteristics and advantages of the invention will emerge from the following description of an embodiment. In the attached drawings.

DETAILED DESCRIPTION OF THE INVENTION

In reference to FIGS. 2a, 2b, and 3 to 6, a device for capture of acid gas contained in combustion fumes of a thermal power plant is described, including a steam circuit. The acid gas is for example carbon dioxide.

The capture device is a device adapted to capture acid gas contained in combustion fumes, such as combustion fumes from a thermal power plant. The capture device is for example dimensioned or configured to capture such acid gas.

In all figures, the elements marked with arrows A, B and C represent fluidic connections from one given element to another.

1. Thermal Power Plant

The power plant is for example a burning thermal power plant. The steam circuit of the thermal power plant includes at least one turbine low-pressure. Low-pressure means for example pressure between 2 and 5 bars. The steam circuit can include several low-pressure turbines. The steam circuit can include one or more high-pressure turbines. The steam circuit can include one or more medium-pressure turbines. The turbines are for examples arranged along a drive shaft. The steam circuit can include exchangers wherein the steam passes between each turbine, the exchangers providing heat to the working fluid coming from the low-pressure turbines prior to evaporation in a boiler 18.

The steam circuit can therefore form a steam fluidic circuit in the thermal power plant ensuring operation of the turbines of the thermal power plant and therefore the energy production of the thermal power plant.

The boiler 18 produces fumes which result from combustion of fuel. It can be any thermal power plant fuel, in particular from a burning thermal power plant, whereof the fumes contain at least one acid gas which the device for capture aims to capture. Therefore the fuel is for example coal or hydrocarbon.

2. Capture Device for Acid Gas

Absorption Means

The device for capture includes absorption means 10 of acid gas. The fumes coming from the boiler 18 are conveyed to the absorption means 10. Upstream of the absorption means 10 cooling means can be arranged, for example a cooler, and/or aeration means for fumes, and/or fume depollution means. At the level of the absorption means 10, fumes are put in contact with a capture fluid including a solvent, the capture fluid being low in acid gas adapted to absorb the acid gas. The absorption means 10 include for example an absorber. The absorber includes for example a column having several sections.

The absorption means 10 of acid gas are means adapted to carry out absorption of acid gas. The absorption means 10 are adapted to ensure the contact of fumes with a fluid low in acid gas, so as to allow absorption of the acid gas by the capture fluid low in acid gas. The absorption means 10 are for example dimensioned or configured to allow such absorption of the acid gas.

The absorption means 10 include for example an absorber.

The capture fluid includes or is for example an aqueous solvent. The capture fluid advantageously has low regeneration energy. The capture fluid includes for example potassium carbonate salts. The capture fluid includes or is for example an aqueous amine solution, forming a solvent, for example an aqueous solution of methyl-diethanolamine. Alternatively, or in addition, the capture fluid advantageously has low volatility. The capture fluid can include piperazine, or amino acid salts.

The device is adapted to operate with such capture fluid.

The fumes whereof the acid gas has been absorbed can be evacuated, for example at the head of the absorber. The evacuated fumes can undergo other treatment.

Regenerator

The device for capture includes a regenerator 1 wherein the capture fluid enriched with acid gas and regeneration fluid steam introduced to regenerate the capture fluid are put in contact. The device includes first introduction means 11 of the regeneration fluid steam in the regenerator 1, arranged such that the regeneration fluid steam introduced to regenerate the capture fluid is superheated steam. The superheated steam is injected into the regenerator so as to minimise thermal transfer and maximise substance transfer. The superheated steam preferably has pressure between 0.3 and 10 bar. The superheated steam has preferably undergone overheating from +20 to +70° C. The regeneration fluid can be water.

Regenerator means a unit in which a chemical compound is regenerated so as to re-establish its activity.

The regenerator is adapted to put the capture fluid enriched in acid gas and steam of regeneration fluid in contact, so that such contacting is done inside the regenerator. The regenerator is adapted so that the steam of regeneration fluid is introduced inside the regenerator, so as to regenerate the capture fluid via such contact. The regenerator is for example configured or dimensioned to allow such contact in the regenerator.

The device includes therefore first introduction means 11 adapted to introduce steam of the regeneration fluid in the regenerator 1, arranged so that the steam of the regeneration fluid introduced to regenerate the capture fluid is a superheated steam.

The first introduction means are for example configured or dimensioned to allow such introduction and such an arrangement.

The first introduction means 11 include for example an introduction element, for example an introduction conduit.

The device is adapted to operate with such regeneration fluid.

Also, the regenerator 1 includes contact means between the capture fluid enriched with acid gas and the superheated regeneration fluid steam. The contact means are adapted to limit contact time between the capture fluid enriched with acid gas and the superheated regeneration fluid steam such that the flow rate of regeneration fluid steam is substantially maintained. The contact time between the capture fluid enriched with acid gas and the regeneration fluid steam must not be too great so as not to condense too much regeneration fluid steam in the capture fluid. The contact means include for example a packed column, a bubble column or a column whereof spray the height/diameter ratio is optimised for this usage.

The contact means between the capture fluid enriched in acid gas and the superheated steam of the regeneration fluid are means adapted to put the capture fluid enriched in acid gas and the superheated steam of the regeneration fluid in contact. The contact means between the capture fluid enriched in acid gas and the superheated steam of the regeneration fluid are for example configured or dimensioned to allow such contact.

The contact time limitation described is therefore obtained for example by the arrangement and/or dimensioning of the capture device, in particular elements making up the capture device, in particular of the regenerator and/or elements connected fluidically to the regenerator. The contact time limitation is for example achieved especially by the dimensioning of the packing column and/or by the choice of values of status variables of fluids circulating in the device.

The regenerator 1 can include multiple packing column and/or trays column.

The fluid at the base of the regenerator, including a considerable proportion of capture fluid low in acid gas, can be reintroduced to the absorption means 10, by means including for example a pump 101 and/or a ramp pulverisation system (not shown). The capture fluid low in acid gas can be reintroduced to the absorption means 10. Before being reintroduced to the absorption means 10, the fluid coming from the base of the regenerator can be cooled by dedicated cooling means, for example a cooler 103 wherein the fluid coming from the base of the regenerator 1 is in thermal exchange with a cold source, for example a cold source of an external water circuit.

By way of symmetry, and for reintroducing to the regenerator the regeneration fluid and/or the working fluid now introduced to the absorption means 10, the fluid at the base of the absorption means 10 can be introduced to the regenerator 1, for example from a washer of the absorption means or a washing stage, via means including a pump 104.

To improve heat economy, an exchanger 105 can be arranged such that the fluid coming from the base of the regenerator 1 transfers some of its heat to the fluid coming from the base of the absorption means 10.

First Condensation Means

The device includes a first evapo-condenser. The first evapo-condenser includes first condensation means in a medium containing a liquid phase of the regeneration fluid and a gaseous phase rich in acid gas, arranged at the head of said regenerator 1. Therefore the fluid coming from the regenerator 1, and including the regeneration fluid and the gas rich in acid gas is separated between a liquid phase and a gaseous phase on exiting from the first condensation means.

The first condensation means are adapted to allow condensation in a medium containing a liquid phase of the regeneration fluid and a gaseous phase rich in acid gas. The first condensation means are for example configured or dimensioned to allow such condensation.

The first condensation means include for example a condenser.

The first condensation means can include partial condensers 2, 3 and 4 adapted to limit the proportion of impurities in the regeneration fluid liquid phase condensed by the first condensation means. At least one liquid portion of regeneration fluid can be partially condensed by a partial condenser, for example at the level of the partial condenser balloon 3 to be recycled to the regenerator 1, for example by return means 22. Recycling is for example made easy by a pump 301. The first condensation means can include a succession of heat exchangers 2, 4 separated by the partial condenser balloon 3.

Each partial condenser for example condenses some of the portion of the regeneration fluid condensed by the first condensation means in their entirety.

The device includes separation means 6 of the liquid phase of the regeneration fluid and of the gaseous phase rich in acid gas. The separation means 6 are arranged downstream of the first condensation means.

Upstream of the separation means 6 dedicated cooling means can be arranged, for example a cooler 5 via a cold source of an external water circuit.

The device can also include purification means 7 of the separate aqueous liquid phase. Such purification means 7 can be located downstream of the separation means 6. The purification means 7 can include a pump 701 arranged upstream of a purification system 702 as such. An expansion device 703 can be arranged downstream of the purification system 702. The purification system 702 can include a packed column. The purification system 702 can include a filtration system on active carbon and/or a resin ion exchange system, and/or an electrodialysis system, and/or any other adapted system.

The absorption means 10 can be adapted to evaporate an excess of regeneration fluid present in the capture fluid, and mix said excess of evaporated regeneration fluid with the liquid phase of the regeneration fluid downstream of the first condensation means. The liquid phase of the regeneration fluid for example has been separated by the separation means 6 before being mixed with the excess of regeneration fluid. Alternatively, mixing the fluid of the excess of the regeneration fluid and of the liquid phase of the regeneration fluid can be carried out at the level of the separation means 6. Mixing can be enabled by transfer means of the excess of fluid 23 also shown in FIG. 2a by the two arrows referenced C, one coming from the absorption means 10, the other directed towards the separation means 6. The regeneration fluid downstream of the first condensation means can be in a liquid state.

The absorption means 10 can for example be adapted to allow evaporation of an excess of regeneration fluid present in the capture fluid when the device is operating, and to allow mixing of said excess of regeneration fluid evaporated with the liquid phase of the regeneration fluid downstream of the first condensation means when the device is operating.

In this way, evaporation is for example permitted by a container dimensioned for this purpose in its form and size, combined with an element for heating the interior of the container, and mixing is achieved for example by a structure for introduction via introduction conduits of fluids to be mixed and their being kept in the container in predefined conditions ensured by the control of conditions internal to the container, for example by the heating means.

First Evaporation Means

The first evapo-condenser includes first evaporation means of the first evapo-condenser, which are in thermal exchange with the first condensation means. The first evaporation means evaporate a working fluid. The working fluid is adapted pour be turbine after passage in the first evaporation means. The working fluid can be a working fluid of a turbine, in particular a low-pressure turbine. The working fluid can be water. In the event where the working fluid is water, it is preferably introduced to the first evaporation means at a pressure for example between 0.3 and 6 bar, for example of around 1 bar.

The device is adapted to operate with such working fluid.

The device includes first reintroduction means 13 of the steam of the working fluid, resulting from the evaporation means, to a first turbine 14. The first turbine 14 can be a low-pressure turbine of the steam circuit of the thermal power plant.

In this way, the yield of the steam cycle associated with the steam circuit is improved since a lesser quantity of heat is necessary. In fact, the contributed heat acts to desorb the acid gas, and not heat the capture fluid or boil the working fluid or the regeneration fluid.

The device can also include flashing means (not shown) of the working fluid upstream of the first evaporation means, a steam phase of the expanded working fluid being introduced to the turbine via the first reintroduction means, and a liquid phase of the expanded working fluid being reintroduced to a preheating train. Such flashing can especially boost the steam titer of the working fluid exiting from the first evapo-condenser.

The flashing means are for example adapted to cause sudden expansion of the working fluid upstream of the first evaporation means, the flashing means being for example arranged to allow introduction of a steam phase of the working fluid expanded in the turbine by the first reintroduction means, and arranged to allow reintroduction of a liquid phase of the working fluid expanded in a preheating train.

The flashing means include for example a flashing expander.

The device for capture can include compression means 8 of the gaseous phase rich in acid gas, in thermal exchange with the first evapo-condenser. The compression means 8 can include a compression train including first compression means 801 at a first pressure, and second compression means 802 at a second pressure greater than the first pressure. The first compression means 801 and the second compression means 802 can for example be separated by drying means of the acid gas. The drying means of the acid gas for example separate water contained in the acid gas and the dried acid gas, the latter being introduced to the second compression means 802. The contained water can be transmitted to a water-treatment system (not shown). The drying means can include a container 803 to which the fluid coming from the first compression means 801 is introduced. The drying means can also include dedicated cooling means, for example a cooler 804 wherein the fluid coming from the first compression means 801, or alternatively from the container 803 (alternative not shown), is in thermal exchange with a cold source, for example a cold source of an external water circuit. An exchanger 9 can be arranged between the first compression means 801 and the second compression means 802, such that the heat coming from the compression means 8 evaporates at least partially the working fluid, for example the working fluid upstream of the reintroduction means 13, for example downstream of the first evapo-condensation means. Alternatively, or by way of complement, the heat coming from the compression means 8 can evaporate at least partially the regeneration fluid upstream of the regenerator 1 by means of an exchanger (alternative not shown).

At the outlet of the compression train, for example at the outlet of the second compression means 802, the acid gas, which can be in a supercritical state, can be cooled by a cooler 805 where the acid gas is in thermal exchange with a cold source, for example a cold source of an external water circuit.

The acid gas exiting from the compression train can be directed towards a transport network of the acid gas, for example by means of a pump 806.

The compression means 8 of the gaseous phase rich in acid gas are for example arranged so as to be in thermal exchange with the first evapo-condenser. Such exchange can be adapted to allow, when the device is operating to at least partially evaporate the working fluid, and/or at least partially evaporate the regeneration fluid upstream of the regenerator.

Therefore, the compression means 8 of the gaseous phase rich in acid gas and the first evapo-condenser are for example adapted to allow exchange of heat between fluids arranged respectively in the compression means 8 of the gaseous phase rich in acid gas and in the first evapo-condenser without needing the fluids to be mixed.

The compression means include for example a compressor.

Because the first condensation means have cooled the gaseous phase rich in acid gas, and the gaseous phase has fewer traces of regeneration fluid, it is not necessary to couple the compression means 8 to multiple partial condensers attached to condenser balloons to collect the cooling fluid in light of reintroducing it to the regenerator 1. Also, the gaseous phase has already undergone these partial condensation and cooling operations, which makes its treatment easier. It is possible to retrieve first condensates rich in capture fluid, in particular rich in solvent, and condensates rich in regeneration fluid. Also, the heat dissipated by compression of the acid gas can be used to further increase the steam titer of the flow of working fluid reintroduced by the first reintroduction means 13.

According to an alternative (not shown), the first evapo-condenser can be a column putting the fluid of the first condensation means and the fluid of the first evaporation means directly in contact.

The first evapo-condenser can be for example a column adapted to directly put the fluid of the first condensation means and the fluid of the first evaporation means in contact. The first evapo-condenser can be for example a column configured or dimensioned to put the fluid of the first condensation means and the fluid of the first evaporation means directly in contact.

3. First Exemplary Embodiment

Figure 2A:
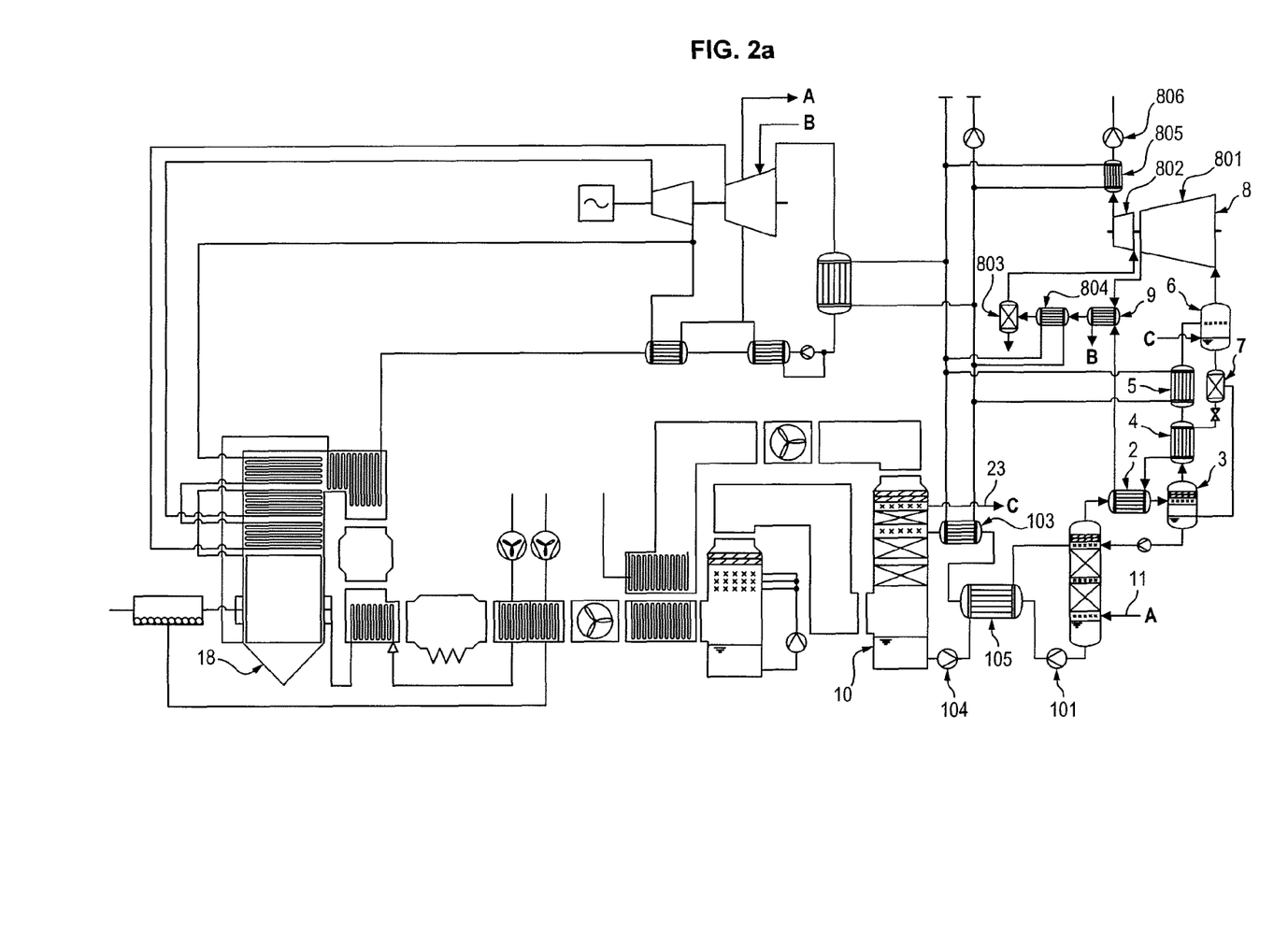
Figure 2B:
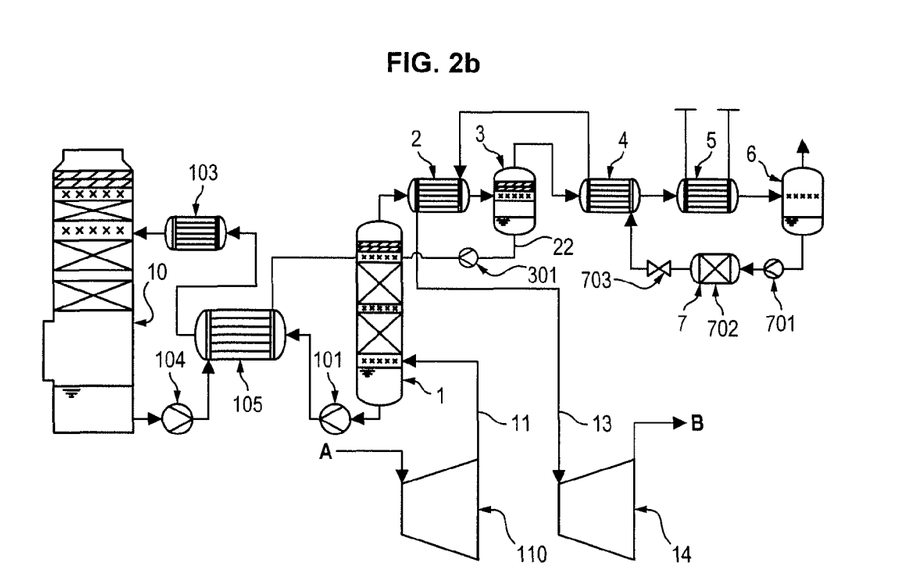

In reference to FIGS. 2a and 2b, the first introduction means 11 of the regeneration fluid steam in the regenerator 1 can be first introduction means of the steam from a second turbine 110, for example via a fluidic connection shown by the two arrows referenced A, the second turbine 110 able to be a turbine of said steam circuit of the thermal power plant.

The regeneration fluid and the working fluid can be formed from the same working fluid of the steam circuit, the turbine 14 belonging to the steam circuit.

It is possible to regenerate the capture fluid enriched with acid gas by putting it in contact with superheated steam coming from the steam circuit of the power plant, then condensing and cooling the fluid coming from the regenerator 1 to separate the acid gas from the regeneration fluid/work. Therefore the fluid introduced by the first introduction means 11 from the steam circuit is reintroduced to the steam circuit by the first reintroduction means 13, in particular after evaporation by the first evaporation means of the first evapo-condenser. The result is improvement in the yield of the steam circuit of the power plant. It is possible to omit the redistiller connected to the regenerator 1. In fact, the pinching of the redistiller, specifically the difference in temperature between the condensation temperature of the sampled steam and the temperature of the regeneration fluid entering the redistiller, involves a strictly negative yield in terms of the second principle of thermodynamics. Also, the fluid can be directly reintroduced to a low-pressure turbine of the steam circuit, without the need for evaporation or extra overheating.

According to an embodiment, the device can be coupled to a supercritical coal power plant of 1.05 GW net, whereof the steam conditions are 270 bars/600° C./60 bars/600° C., and raw LHV yield (Lower Heating Value) of 45.2% with a method for capture of carbon dioxide with monoethanolamine (35% by mass). The working fluid is water.

According to an embodiment, the operating pressure of the regenerator 1 is 2.7 bars. The rate of capture of carbon dioxide is 90% or 700 t/h of carbon dioxide. The superheated steam of the working fluid to be injected by the first introduction means 11 is sampled by a low-pressure turbine 14 at 2.7 bars and 194° C. The regenerator 1 has a column having a layer of structured packing, for example 250 $m^2/m^3$, 3 meters. On exiting at the head of the regenerator 1, the fluid including the working fluid and the carbon dioxide is condensed at 130° C., then at 95° C. by the first condensation means of the first evapo-condenser, then at 40° C. by a cooler.

The carbon dioxide separated by the separation means 6 is compressed by the compression means 8 up to 70 bars before being dehydrated to then be compressed up to 110 bars.

The liquid phase of the working fluid separated by the separation means 6 is treated by purification means 7 so as to separate the working fluid from impurities such as traces of capture fluid, solvents or carbonates. The purified working fluid is expanded by an expansion device 703 at 1.5 bars then introduced to the first evaporation means to acquire a steam titre of 0.935 for example if the first evapo-condenser includes several partial condensers 2 and 4 and is in thermal exchange with the compression means 8. The steam is reintroduced by the first reintroduction means 13 to the steam circuit of the power plant, for example via a fluidic connection shown by the two arrows referenced B, where it is mixed with superheated steam at 1.5 bar. The result is steam slightly superheated at 1.5 bar which will feed another part of the low-pressure turbine.

The power consumption for ventilators, capture fluid recirculation pumps, and compression means 8 represent around 65 MW to which must be added 2 MW for an extraction pump of the first condensation means, and 5 MW for purification means 7 including an electrodialysis system. The loss in electric production on the turbine train is 90 MW. Finally the increased need for cooling water needs pumping power of an extra 5 MW. The loss total in electric power is therefore 102 MW or net production of 0.95 GW and a net yield of 38.2%. The loss in yield due to installation of the carbon dioxide capture unit is 7%.

4. Second Exemplary Embodiment

Figure 3:
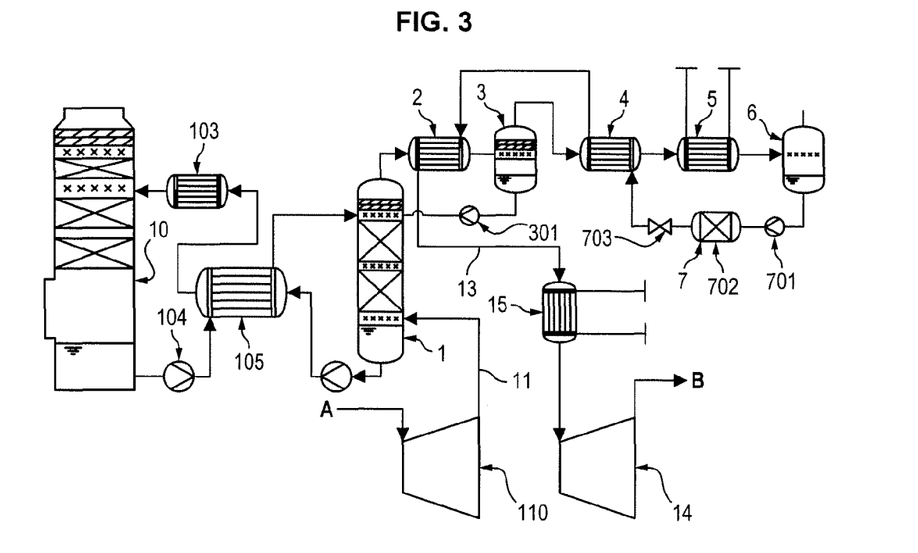

In reference to FIG. 3, the first introduction means 11 of the regeneration fluid steam in the regenerator 1 can be first introduction means of the steam from a second turbine 110, the second turbine 110 able to be a turbine of said steam circuit of the thermal power plant.

The regeneration fluid and the working fluid can be formed from the same working fluid of the steam circuit, the turbine 14 belonging to the steam circuit.

The device can include superheating means 15 adapted to re-superheat the working fluid downstream of the first evapo-condenser, in particular downstream of the first evaporation means and prior to reintroduction to the steam circuit by the first reintroduction means 13. The superheating means 15 can provide heat coming from the boiler 18 (not shown FIG. 3). This enables more improvement of the steam cycle. This also operates the regenerator 1 at higher pressure and/or better develops the heat generated in the boiler 18.

The superheating means 15 are for example arranged downstream of the first evapo-condenser, so as to allow re-superheating of the working fluid coming from the first evapo-condenser.

The superheating means 15 include for example a re-superheater.

5. Third Exemplary Embodiment

Figure 4:
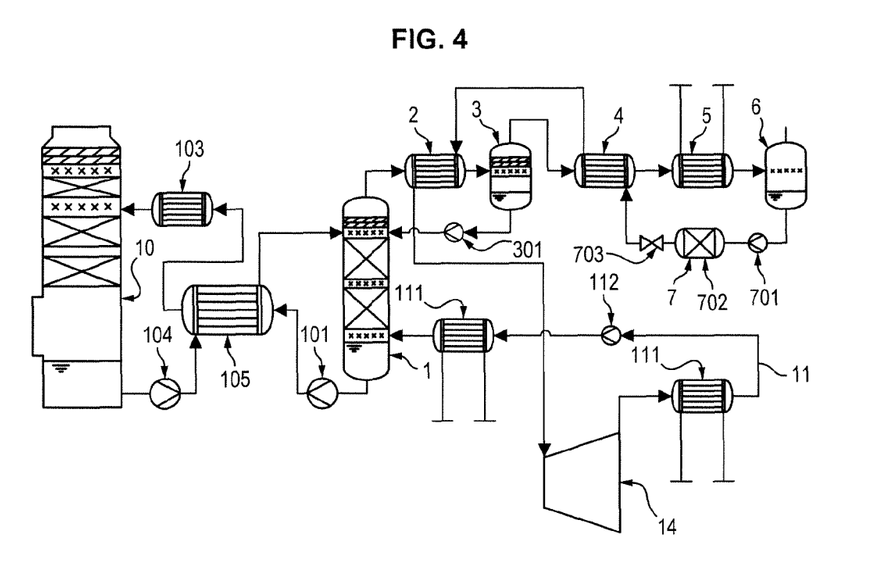

In reference to FIG. 4, the first introduction means 11 of the regeneration fluid steam in the regenerator 1 can be first introduction means of the steam from a turbine, this able to be the first turbine 14 (shown FIG. 4) or the second turbine 110 (not shown FIG. 4), this turbine able to be a turbine of said steam circuit of the thermal power plant.

The regeneration fluid and the working fluid can be formed from the same working fluid of the steam circuit. The turbine 14 belonging to the steam circuit.

The first introduction means 11 can include a dedicated distiller 111 or several dedicated distillers. The first introduction means 11 can include a pump 112 arranged between the distillers 111.

The steam circuit can be a steam circuit dedicated to the device including a dedicated more robust first turbine 14. It is possible to avoid the problems caused by the presence of a trace of capture fluid, in particular solvent, or carbonate ions in the other turbines of the power plant.

6. Fourth Exemplary Embodiment

Figure 5:
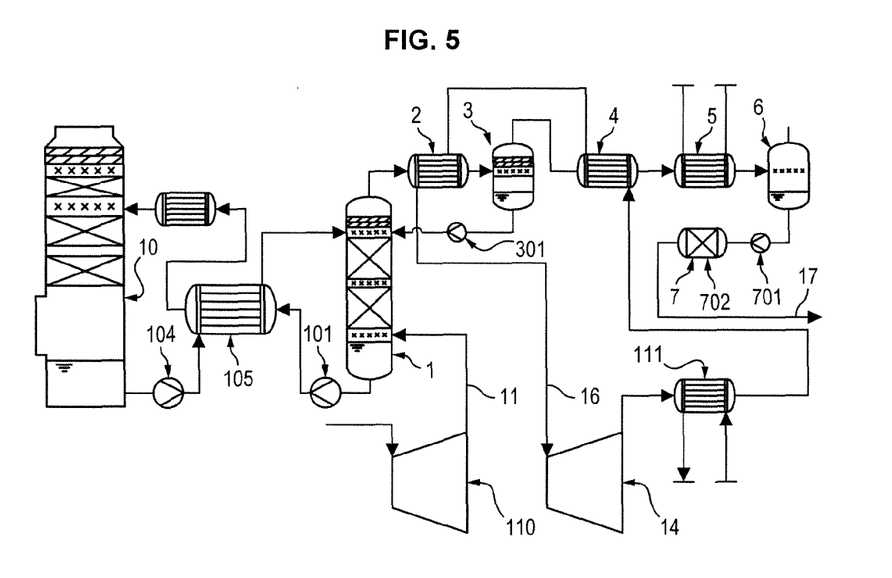

In reference to FIG. 5, the first introduction means 11 of the regeneration fluid steam in the regenerator 1 can be first introduction means of the steam from a second turbine 110, the second turbine 110 being a turbine of said steam circuit of the thermal power plant.

The first turbine 14 can belong to a closed working fluid circuit 16 separate from the steam circuit, the working fluid circuit 16 forming an organic Rankine cycle. The first evapo-condenser can act as warm source of the organic Rankine cycle.

Also, the device can include second reintroduction means 17 of the regeneration fluid separate at the level of a boiler 18 (not shown FIG. 5) of the steam circuit.

It is possible to integrate the device into installations of lesser size, to which the Rankine cycle can be adapted.

7. Fifth Exemplary Embodiment

Figure 6:
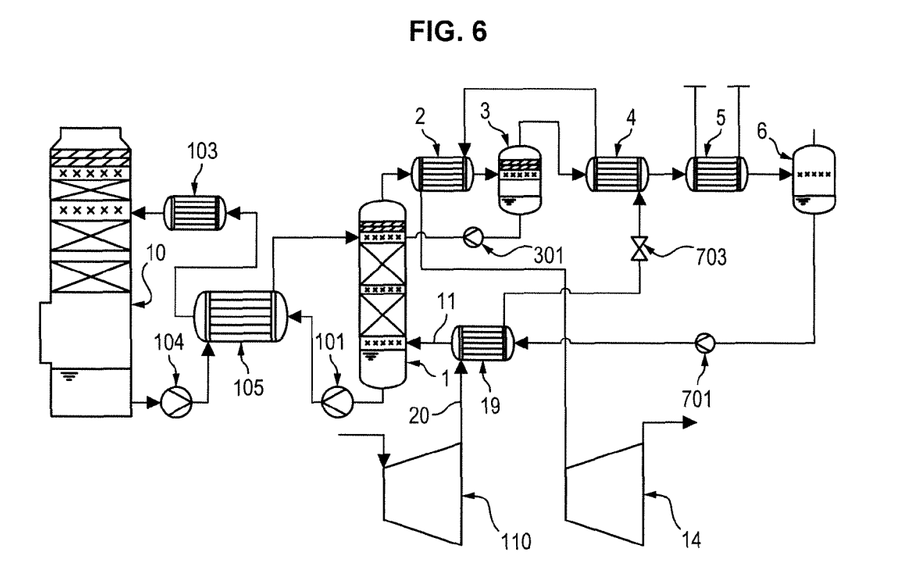

In reference to FIG. 6, the device can include a second evapo-condenser 19. The second evapo-condenser 19 can include second condensation means of the working fluid, located upstream of the first evapo-condenser, the second condensation means being adapted to condense said working fluid. The device can also include second introduction means 20 of the working fluid from the steam circuit of the thermal power plant to the second condensation means 19.

The second evapo-condenser 19 can include second evaporation means which evaporate the regeneration fluid downstream of the separation means 6 and upstream of the first introduction means 11, the second evaporation means being in thermal exchange with the second condensation means.

Therefore the first evapo-condenser especially acts as a condenser of the regenerator 1 while the second evapo-condenser acts especially as a distiller of the regenerator 1. It is possible to avoid direct contacting of the steam and of the capture fluid.

In particular, and according to an alternative not shown here, the second evapo-condenser can put the fluid of second condensation means and the fluid of second evaporation means directly in contact.

The second evapo-condenser can for example include second evaporation means which are adapted to evaporate the regeneration fluid downstream of the separation means 6 and upstream of the first introduction means 11, the second evaporation means being adapted to be in thermal exchange with the second condensation means. The second evaporation means can for example be configured or dimensioned to evaporate such fluid and/or configured or dimensioned to be in such thermal exchange.

The second evapo-condenser can for example be adapted to put the fluid of the second condensation means and the fluid of the second evaporation means directly in contact. The second evapo-condenser can be configured or dimensioned for example to put the fluid of the second condensation means and the fluid of the second evaporation means directly in contact.

8. Method for Capture of Acid Gas

Figure 7:
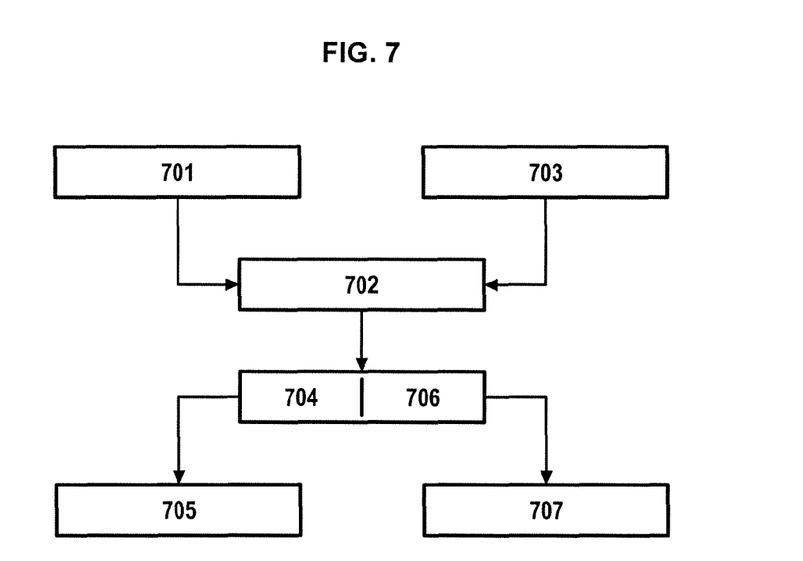
FIG. 7 illustrates the steps of acid gas according to another exemplary embodiment of the invention.

In reference to FIG. 7, a method is described for capture of acid gas contained in combustion fumes of a thermal power plant including a steam circuit, the method including steps consisting of:
  absorption 701 of the acid gas by contacting the fumes with a capture fluid low in acid gas,
  regeneration 702 of the capture fluid by contacting capture fluid rich in acid gas and regeneration fluid steam introduced to regenerate capture fluid,
  introduction 703 of the regeneration fluid steam,
  condensation 704 of a medium containing regeneration fluid and acid gases after regeneration, in a medium containing a liquid phase of the regeneration fluid and a gaseous phase rich in acid gas,
  separation 705 of the liquid phase from the regeneration fluid and the gaseous phase rich in acid gas,
characterized in that:
  the regeneration fluid steam introduced to regenerate the capture fluid is superheated steam,
  the regeneration 702 includes a limitation of the contact time between the capture fluid enriched with acid gas and the regeneration fluid steam such that the flow rate of regeneration fluid steam is substantially maintained,
  condensation 704 is performed in thermal exchange with evaporation 706 of a working turbine fluid, and
  the method also includes the reintroduction 707 of the steam of the working fluid obtained by evaporation to a first turbine.

The exemplary embodiments described are intended to cover variants, modifications and equivalents, which are included in the spirit and the extent of the invention such as defined by the attached claims. Also, in the detailed description of the exemplary embodiments, many specific details are disclosed to provide detailed comprehension of the invention claimed. However, a man skilled in the art will understand that various embodiments can be put into practice without these specific details.

Even though the characteristics and the elements of the present exemplary embodiments are described in the embodiments in particular combinations, each characteristic or element can be utilise alone without the other characteristics and elements of the embodiments or in diverse combinations with or without other characteristics and elements presented here.

This written description uses examples of the object presented to allow any man skilled in the art to put the above into practice, including manufacturing and using any devices or systems and by applying any incorporated methods. The patentable scope of the object is defined by the claims, and can include other examples which may occur to those skilled in the art. These other examples are intended to be within the scope of the claims.

The invention claimed is:

1. A device for capturing acid gas contained in combustion fumes of a thermal power plant including a steam circuit, the device including:
  absorption means (10) for absorbing the acid gas contained in said combustion fumes by contacting the fumes with a capture fluid low in said acid gas,
  a regenerator (1) which receives the capture fluid enriched with the absorbed acid gas and includes a first introduction means (11) for introducing a regeneration fluid steam and putting the enriched capture fluid into contact with the introduced regeneration fluid stream to regenerate the capture fluid,
  first condensation means (2, 3, 4) in a medium containing a liquid phase of the regeneration fluid and a gaseous phase rich in said acid gas, arranged at a head of said regenerator (1),
  separation means (6) for separating the liquid phase and the gaseous phase,
wherein:
  the introduced regeneration fluid steam is a superheated steam,
  the regenerator (1) includes contact means between the capture fluid enriched with the absorbed acid gas and the superheated regeneration fluid steam, for limiting the contact time between the two such that the flow rate of the regeneration fluid steam is substantially maintained,
  a first evapo-condenser which includes the first condensation means (2, 3, 4) and a first evaporation means which by operation in a thermal exchange between said first condensation means and said first evaporation means, evaporate a working fluid, and
  the device further includes a first reintroduction means (13) for providing the working fluid as a steam to a first turbine (14).

2. The device according to claim 1, wherein the absorption means (10) are adapted to:
  evaporate an excess of the regeneration fluid present in the capture fluid, and
  mix said evaporated excess regeneration fluid with the liquid phase of the regeneration fluid downstream of the first condensation means (2, 3, 4).

3. The device according to claim 1, wherein the first condensation means (2, 3, 4) include partial condensers adapted to limit a proportion of impurities in the regeneration fluid liquid phase condensed by the first condensation means (2, 3, 4), and wherein at least one liquid portion of the regeneration fluid partially condensed by one of said partial condensers is recycled in the regenerator.

4. The device according to claim 1, further including compression means (8), in thermal exchange with the first evapo-condenser to:
  evaporate at least partially the working fluid, and/or
  evaporate at least partially the regeneration fluid upstream of the regenerator (1).

5. The device according to claim 1, wherein the device includes a heating means for heating the working fluid upstream of the first evaporation means, a steam phase of the expanded working fluid being introduced to the first turbine via the first reintroduction means, and a liquid phase of the expanded working fluid being reintroduced to a preheating train.

6. The device according to claim 1, wherein the device further includes superheating means (15) adapted to re-superheat the working fluid downstream of the first evapo-condenser.

7. The device according to claim 6, wherein the capture fluid includes an aqueous amine solution.

8. The device according to claim 1, wherein at least one of the working fluid and the regeneration fluid is water.

9. The device according to claim 1, wherein said device includes purification means (7) for purifying a separate aqueous liquid phase, located downstream of the separation means (6).

10. The device according to claim 9, wherein the purification means (7) include at least one of a filtration system on active carbon, a resin ion exchange system, and an electrodialysis system.

11. The device according to claim 1, wherein the first introduction means (11) introduces fluid from at least one of:
the first turbine (14) of said steam circuit, and
a second turbine (110) of said steam circuit.

12. The device according to claim 11, wherein the regeneration fluid and the working fluid are formed from working fluid of the steam circuit.

13. The device according to claim 1, wherein:
the first turbine (14) belongs to a closed working fluid circuit (16) separate from the steam circuit, the working fluid circuit (16) forming an organic Rankine cycle, and the device includes a separate second reintroduction means (17) of the regeneration fluid at the level of a boiler (18) of the steam circuit.

14. The device according to claim 1, further including:
second condensation means (19) located upstream of the first evapo-condenser for condensing said working fluid,
second introduction means (20) for introducing the working fluid from the steam circuit to the second condensation means (19), the second condensation means (19) including a second evapo-condenser, the second evapo-condenser including second evaporation means for evaporating the regeneration fluid downstream of the separation means (6) and upstream of the first introduction means (11), the second evaporation means being in thermal exchange with the second condensation means.

15. The device according to claim 14, wherein the second evapo-condenser puts the fluid of the second condensation means and the fluid of the second evaporation means directly in contact.

16. The device according to claim 1, wherein the first evapo-condenser or the second evapo-condenser is a column putting the fluid of the first condensation means and the fluid of the first evaporation means directly in contact.

17. A thermal power plant including a steam circuit and a boiler, and a device according to claim 1.

18. A capture method for capturing acid gas contained in combustion fumes of a thermal power plant including a steam circuit, the method including steps of:
chemically absorbing (701) the acid gas contained in said combustion fumes by contacting the fumes with a capture fluid low in said acid gas,
introducing (703) a regeneration fluid steam to regenerate the capture fluid;
regenerating (702) the capture fluid by contacting the capture fluid enriched with said acid gas and the regeneration fluid steam introduced to regenerate the capture fluid,
condensing (704) a medium containing a regeneration fluid and said acid gases after said regenerating (702), in a medium containing a liquid phase of the regeneration fluid and a gaseous phase rich including said acid gas,
separating (705) the liquid phase of the regeneration fluid and the gaseous phase rich in said acid gas,
wherein:
the regeneration fluid steam introduced to regenerate the capture fluid is a superheated steam,
said regenerating (702) includes limiting a contact time between the capture fluid enriched with acid gas and the regeneration fluid steam such that the flow rate of regeneration of said fluid steam is substantially maintained,
said condensing (704) is performed in a thermal exchange with an evaporation (706) of a working turbine fluid, and
the method also includes reintroducing (707) the steam of the working fluid obtained by said evaporation to a first turbine.

* * * * *